(12) United States Patent
Bruso et al.

(10) Patent No.: US 10,678,925 B2
(45) Date of Patent: Jun. 9, 2020

(54) DATA QUARANTINE AND RECOVERY

(71) Applicant: Microsoft Technology Licensing, LLC, Redmond, WA (US)

(72) Inventors: Jonathan Bruso, Sammamish, WA (US); Andrew Glover, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 15/633,472

(22) Filed: Jun. 26, 2017

(65) Prior Publication Data
US 2018/0373877 A1 Dec. 27, 2018

(51) Int. Cl.
| | |
|---|---|
| *G06F 21/56* | (2013.01) |
| *G06F 15/16* | (2006.01) |
| *G06F 15/177* | (2006.01) |
| *G06F 21/52* | (2013.01) |
| *G06F 21/78* | (2013.01) |
| *G06F 21/55* | (2013.01) |
| *G06F 21/40* | (2013.01) |
| *G06F 21/31* | (2013.01) |
| *G06F 16/182* | (2019.01) |

(52) U.S. Cl.
CPC .......... *G06F 21/568* (2013.01); *G06F 16/182* (2019.01); *G06F 21/316* (2013.01); *G06F 21/40* (2013.01); *G06F 21/52* (2013.01); *G06F 21/552* (2013.01); *G06F 21/554* (2013.01); *G06F 21/56* (2013.01); *G06F 21/561* (2013.01); *G06F 21/566* (2013.01); *G06F 21/78* (2013.01)

(58) Field of Classification Search
CPC ...... G06F 21/568; G06F 21/554; G06F 21/56; G06F 21/566

USPC .......................................................... 726/24
See application file for complete search history.

(56) References Cited

U.S. PATENT DOCUMENTS

| | | |
|---|---|---|
| 7,707,632 B2 | 4/2010 | Nath et al. |
| 7,734,600 B1 | 6/2010 | Wise et al. |
| 8,566,946 B1 | 10/2013 | Aziz et al. |

(Continued)

OTHER PUBLICATIONS

Sheldon, Robert, "Use data loss prevention software to secure endpoints from malicious insiders", https://web.archive.org/web/20120608085518/http://searchenterprisedesktop.techtarget.com/tip/Use-data-loss-prevention-software-to-secure-endpoints-from-malicious-insiders, Published on: Jun. 8, 2012, 5 pages.

*Primary Examiner* — Haresh N Patel
(74) *Attorney, Agent, or Firm* — Schwegman Lundberg & Woessner, P.A.

(57) ABSTRACT

In some embodiments, disclosed subject matter involves proactive monitoring and detection of anomalies in user data hosted by a cloud storage server and user interaction with data to trigger quarantine of user data stored in the cloud storage. In at least one embodiment, data recovery from one or more quarantine states is available to a user after authentication. Quarantine levels may permit or prohibit various actions on the user data by the user who owns the data, an asynchronous process for data cleanup, and access by other authorized users, etc. In an embodiment, quarantine levels are associated with the user and affect the user data space rather than merely individual files. The proactive monitoring may include collection of telemetry based on the API calls to the cloud server, scanning of user file system and hierarchy, and other file or data space corruption. Other embodiments are described and claimed.

20 Claims, 6 Drawing Sheets

(56) References Cited

U.S. PATENT DOCUMENTS

| | | | |
|---|---|---|---|
| 9,154,364 B1 | 10/2015 | Daswani et al. | |
| 9,237,170 B2 | 1/2016 | Kiang et al. | |
| 9,286,473 B2 | 3/2016 | Cruz Mota et al. | |
| 2007/0188303 A1* | 8/2007 | Faro | G07C 9/00103 340/5.73 |
| 2009/0282485 A1* | 11/2009 | Bennett | G06F 21/51 726/24 |
| 2011/0078497 A1* | 3/2011 | Lyne | G06F 11/1469 714/15 |
| 2011/0184935 A1* | 7/2011 | Marlin | G06Q 50/10 707/719 |
| 2011/0218980 A1* | 9/2011 | Assadi | G06F 16/2329 707/700 |
| 2011/0252264 A1* | 10/2011 | Solinas | G06F 9/522 713/400 |
| 2012/0151582 A1* | 6/2012 | Reasor | G06F 21/564 726/23 |
| 2013/0042246 A1* | 2/2013 | Berry | G06F 1/3206 718/102 |
| 2014/0026182 A1* | 1/2014 | Pearl | G06F 21/60 726/1 |
| 2015/0278354 A1 | 10/2015 | Morrey et al. | |
| 2016/0259811 A1* | 9/2016 | MacKay | G06F 16/178 |
| 2018/0232534 A1* | 8/2018 | Dotan-Cohen | G06F 21/6245 |

* cited by examiner

DATA QUARANTINE AND RECOVERY

TECHNICAL FIELD

An embodiment of the present subject matter relates generally to protecting user data, and, more specifically but without limitation, to monitoring user cloud data storage and to quarantine a user's data and allow for recovery when a potential permanent data loss risk is identified.

BACKGROUND

Various mechanisms exist for protecting data from malware, viruses and data loss. Typical virus and malware scanners run in the background to identify malicious code in individual files. Other systems scan files as they are uploaded, downloaded or transferred onto a protected system or sent/received in an e-mail. Some scanners are scheduled to run at specific intervals. Some scanners may be launched to run immediately, or at a delayed time. Other systems are designed to protect data from being released to third parties or being removed from a secure facility or storage area, often due to confidentiality. However, this type of data "loss" is conceptually different from protecting a user's data from permanent loss in the sense of corruption, deletion, or broken director)/links, etc. Recently, malicious third parties have been hijacking user's data by encrypting or locking it and requesting payment to unlock the data for use, also known as ransomware.

However, existing systems fail to anticipate and block all types of data loss and allow for adequate recovery. Also, many malware scanners are designed to scan individual files on a user device rather than operate in one or more user data storage areas in a cloud storage system/device. Existing systems are typically reactive rather than proactive when it comes to monitoring of data files.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
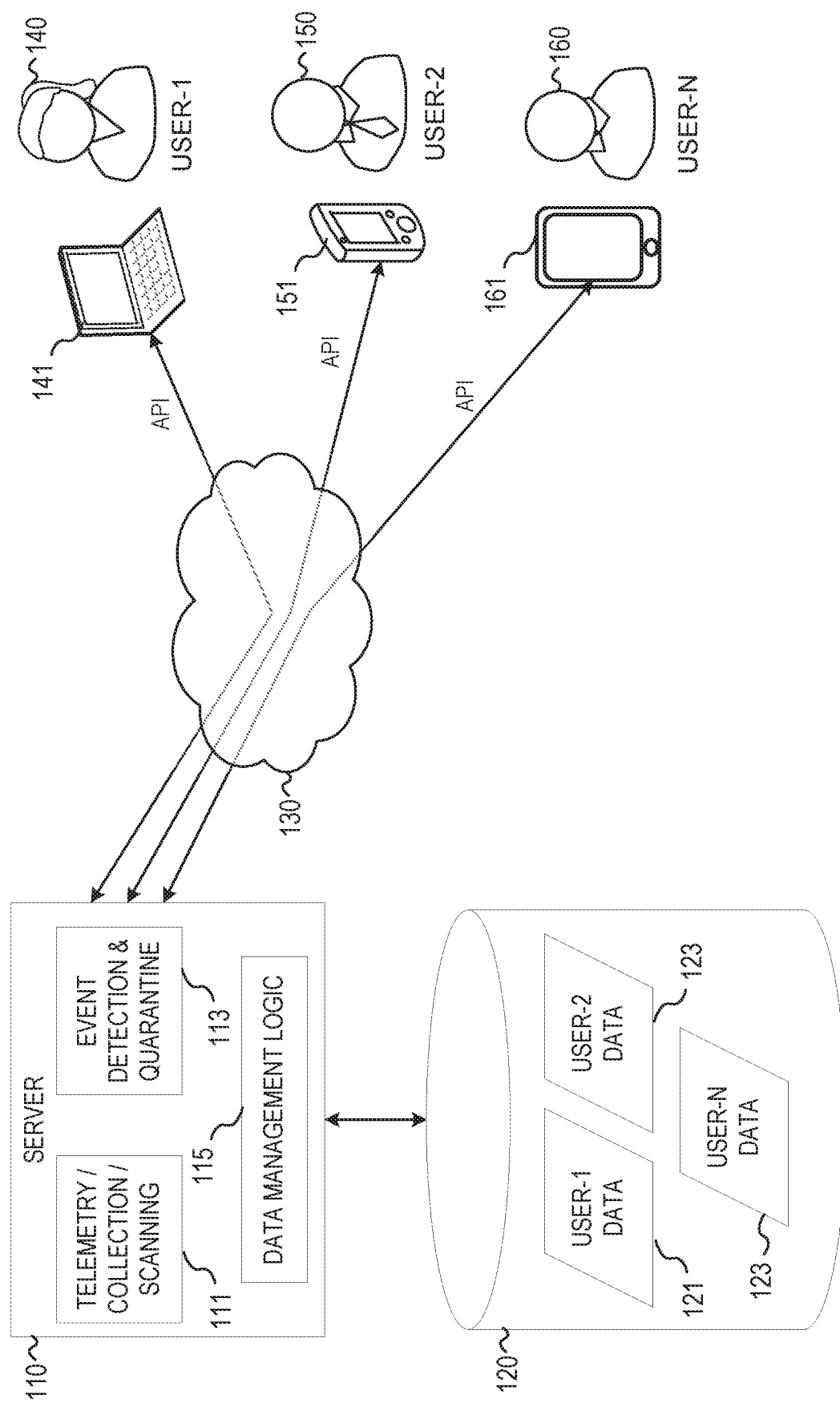
FIG. 1 is a block diagram illustrating a system for data quarantine and recovery for a cloud storage system, according to an embodiment.

In the following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter is a system and method relating to proactive monitoring and detection of anomalies in user data and user interaction with data to trigger quarantine of user data stored in cloud storage. In at least one embodiment, data recovery from one or more quarantine states is available to a user after authentication. Cloud systems may be vulnerable to attacks against user data, rogue user clients, or unusual application programming interface (API) patterns. Any of these events may leave the user data in a compromised or corrupted state. Continuing to allow unrestricted user access to data while in a compromised state may lead to further corruption or total loss of data. Further, attempting synchronization of versions or distributed data while in a compromised state may also lead to permanent loss of data. Embodiments as described herein proactively monitor user data partitions for unusual activity. This proactive monitoring allows multi-state quarantines and enhanced mechanisms for user recovery of data.

It should be understood that cloud systems may provide for several states for user data. For instance, when a user selects to delete a file, the file may be put into a recycle bin, trash can, or temporary area allowing for user recovery of that file, within a specific time period. Once the user empties the trash (e.g., receptacle for deletions), the file may still be recoverable by the cloud storage administrator or information technology (IT) personnel. After some period of time, all cached or mirrored copies of the deleted file will undergo a hard delete and be completely unrecoverable. Asynchronous background processes may be executed on the cloud storage server to periodically clean up deleted, updated, moved, or otherwise modified user data. As discussed, a background process may be initiated by a user or system daemon, or similar, and scheduled for continuous or periodic execution with no user interface required. A background process may be automatically launched or scheduled by another process or module with no user intervention required. Results of a background process may be stored in memory for later retrieval or sent to another process or user directly, via process to process messaging, or similar. These types of background processes that manage user data may be seen as asynchronous because they may be launched and run proactively at periodic intervals rather than reactively or in immediate response to user action. Embodiments as described herein, may identify events and impose quarantines in advance of the hard file deletions and cleanup, therefore allowing for recovery by the user. This process may be conceptualized as three phases: (1) detection; (2) quarantine/hold data; and (3) recovery.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

FIG. 1 is a block diagram illustrating a system for data quarantine and recovery for a cloud storage system, according to an embodiment. In an embodiment, data storage is available to users in data storage 120. While only one storage device 120 is shown, it will be understood that user data 121, 122, 123 may be stored on one or more physical media and that data for different users may be collocated with other user data and/or be stored on different physical or virtual devices. The individual user devices may have virtual or physical separation to provide secure storage areas for each user. A user partition of data, or secure storage area, may also be referred to as a user space, or user data area, for discussion purposes. Data management may be performed by one or more data management processes 115 on server 110.

In an embodiment, server 110 includes logic, modules or processes to monitor access to user data and data integrity. A telemetry, collection and scanning (TCS) module 111 may provide background processing to help identify data loss potential. In an embodiment, telemetry may be collected that pertains to access, or attempted access to a user's data. User data in cloud storage may be accessed using application program interfaces (APIs) in user applications. In an example, TCS module 111 may monitor API calls to the cloud storage. For instance, users 140, 150 and 160 may access user data via a laptop 141, smartphone 151, or tablet 161, respectively. It will be understood that other devices may be used to access user data via a network 130. Users 140, 150 and 160 may access their data via applications using API calls to the cloud server 110. The API calls may be monitored by the TCS module 111 for various behavior such as repetitive deletions; data uploads; data downloads; number of file updates; number of updates to a single file; number of file moves; number of file renames; etc. Allowable thresholds for collected telemetry may be defined by the cloud storage system administrator or be defined and integrated into a service level agreement for the cloud service. In an embodiment, telemetry that exceeds a threshold or falls outside of an acceptable range may trigger a quarantine. Other telemetry that may trigger a quarantine may include API error codes; lower user level quality of service (QoS); and incoming user support tickets and end user reports, or other complaints that there are problems with the data. It will be understood that other telemetry items may be pre-defined to trigger a quarantine.

In an embodiment, the TCS module 111 may also perform other background processing to monitor the health and integrity of user data. For instance, files for User-1 140 may be stored in a data area 121. Background processes may validate file formats for files in the user data area 121. In an example, a file of extension .jpg (e.g., an expected JPEG file) may be examined to ensure that the file has the appropriate headers and metadata for a JPEG file. File folder links and folder/directory hierarchy may be examined to determine that all user files are appropriately accessible through the expected file folder hierarchy and that there are no broken links to data. Virus and malware scans may be included in the background processing. Individual files may be scanned for malware, corruption, file type integrity, etc. Scans for integrity of the user space hosting the user data may be periodically scanned for file system integrity, missing links, segments or file portions, etc. API calls requesting access to data may track and collect information regarding frequency and other temporal and count information for file deletion requests, file modification requests, file encryption requests, file property change requests, file overwrite requests, or file move requests, etc. The various background processes may be automatically run at pre-defined times or intervals, or be continuously run in a loop (e.g., interval=0). When an unexpected API call pattern or other anomaly is identified, a trigger may be generated that identifies the issue, or event, and associates the event with a user, data area, time stamp, and other identifying information. The background scans may identify both user or third party initiated corruption, as well as, system generated corruption, for instance, when the data management logic has a bug or malware causing misplacement of data or other corruption or loss of data.

Event detection module 113 may receive notice of an event or trigger and initiate a level of quarantine for the user. Event detection module 113 may have pre-defined thresholds and ranges for the various telemetry categories. In an embodiment, when the collected telemetry falls outside of expected ranges, the event detection module may initiate a level of quarantine for user data. Unlike existing technologies that typically quarantine individual files, event detection logic 113 may quarantine the entire user data in the user space. In an embodiment, multiple quarantine levels may be available based on the type of event or trigger detected. In an embodiment, an administrator of the cloud server may manually trigger a quarantine state for a user. For instance, when analysis of telemetry indicates an unexpected problem with the file system or data management logic that otherwise might not trigger an event, a manual quarantine may be desired.

Existing scanning systems are typically reactive in nature, and based on individual files. In other words, scans may be performed on a file responsive to an upload or download of the file. Background processes as described herein are proactive in nature and may be performed for the entire user space rather than individual files. Thus, anomalies or unusual behavior may be identified earlier, and may allow for loss avoidance and full recovery.

Figure 2:
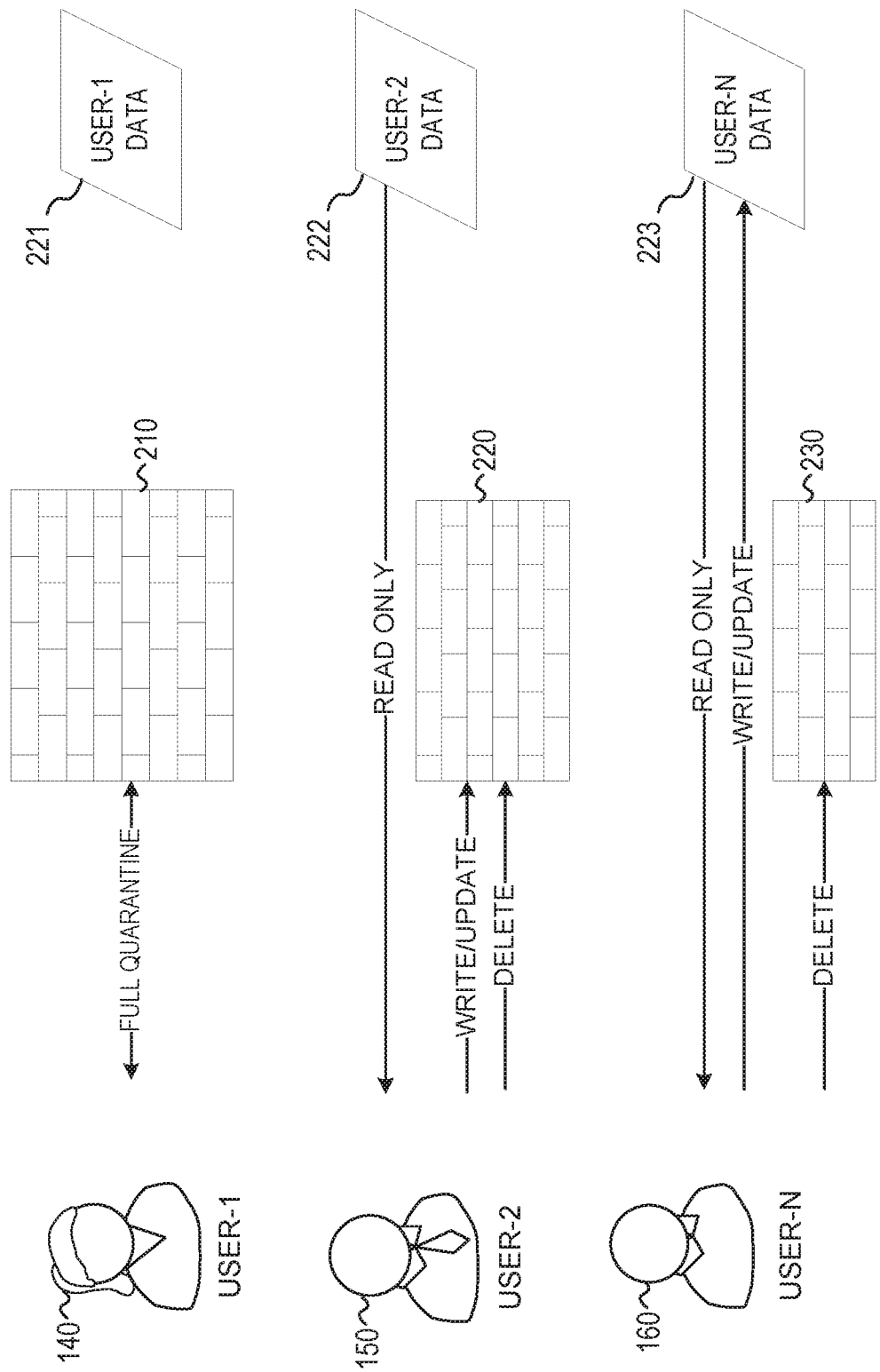
FIG. 2 illustrates multiple levels of quarantine and data states, according to an embodiment.

FIG. 2 illustrates multiple levels of quarantine and data states, according to an embodiment. In an embodiment, User-1 140 is associated with User-1 data 221 stored in cloud data storage. Under normal operating conditions, User-1 140 may have full access and control of the data 221. In an example, an event may be detected that indicates User-1 data 221 may be in imminent danger of deletion loss (e.g., multiple delete API calls made beyond threshold), corruption, or other loss. In this event, the event detection module may perform a full quarantine 210 all of the User-1 data 221. The full quarantine may block read/write/update and other access to all files stored by User-1. In the case that User-1 has provided access to another user for one or more files, the other user will also be locked out of access of User-1 data 221 until User-1 140 performs recovery operations. Thus, the data may be blocked from all access. In an embodiment, event detection module may send User-1 140 a notification of the triggered event and provide a link to a recovery location, e.g., Uniform Resource Locator (URL) for a recovery interface.

Figure 3:
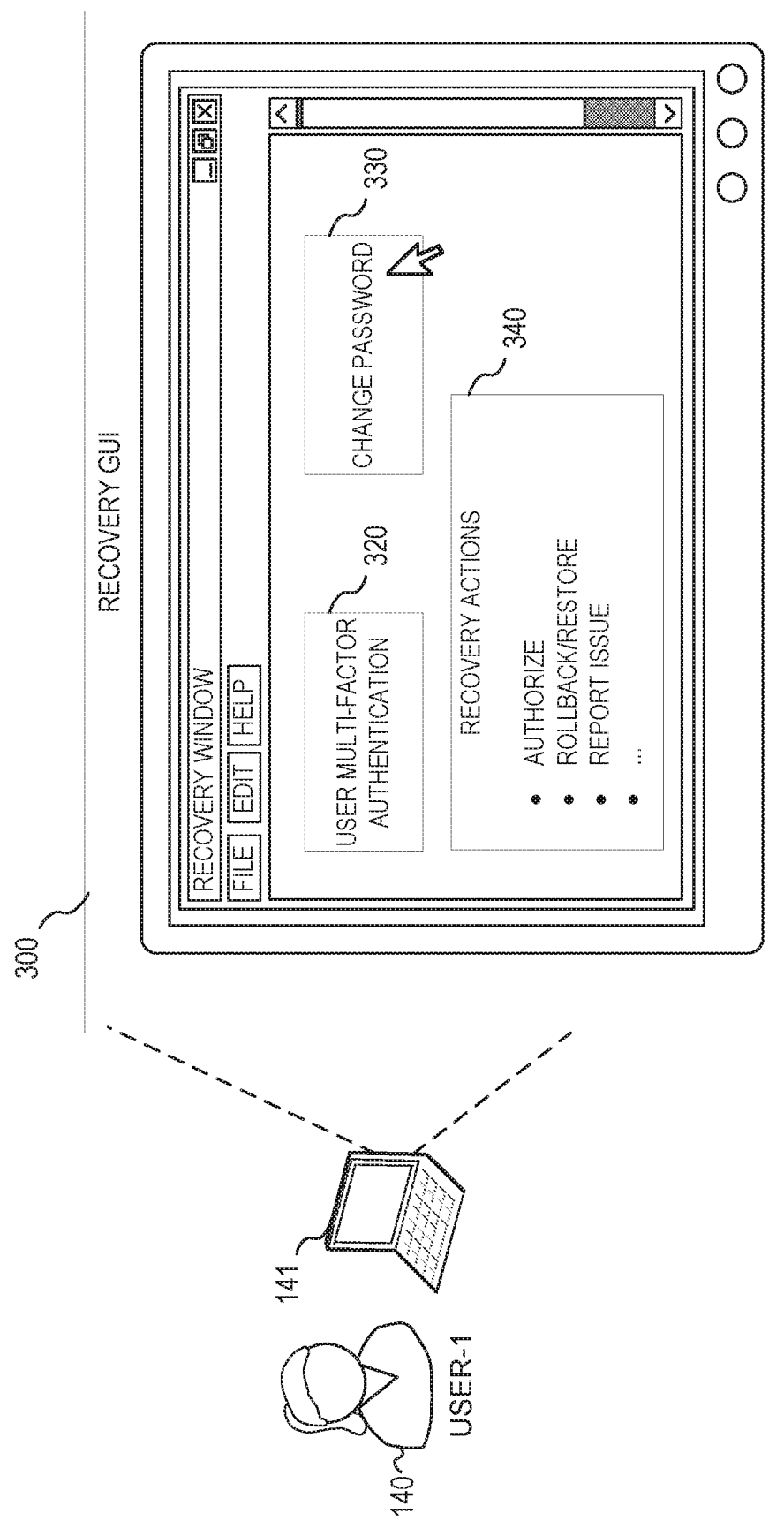
FIG. 3 illustrates a graphical user interface for data recovery, according to an embodiment.

FIG. 3 illustrates a graphical user interface (GUI) 300 for data recovery, according to an embodiment. In an embodiment, User-1 140 may access the cloud storage using a computing device 141. In an example, the cloud server 110 may send a notification to User-1 140 to identify that too many delete requests have been received by the API and provide a Web location (e.g., URL) for authentication or recovery. The cloud storage server provider/system administrator may identify the thresholds and ranges for what constitute anomalous API calls or rates that are out of the ordinary. In an embodiment, the thresholds many be negotiated with the user and/or defined in a service level agreement for the user, or be derived from statistical analysis of past user behavior. In an embodiment, multi-factor authentication 320 may be required to authenticate the user before recovery actions 340 may be performed. In an example, User-1 140 may be required to enter a password and present a biometric, contextual or other authentication information before being permitted to proceed. The user may also be prompted to change her primary password 330 as further protection. In the case of a full quarantine, as described above, User-1 140 may be prompted to provide authorization for the deletions, request a rollback and restore of deleted information, or report the issue for further investigation as part of the recovery process 340.

Referring again to FIG. 2, the event detection module may detect an event that warrants only partial quarantine. In an example, User-2 150 may experience a potential loss of data, but still be granted read access 220 of User-2 data 222. Full write/update and delete access may be restored after User-2 150 performs authentication and recovery, as discussed above in conjunction with FIG. 3. In another example, User-N 160 may be put into a minimal quarantine 230 where only file deletes are blocked for User-N data 223. Event detection module (113) may utilize a set of static or dynamically changeable rules that identify quarantine state/level for a specific detected event. In an example, quarantine state levels may be stepped up based on frequency of events detected for a particular user. For instance, the first time a particular event is detected for User-N, only deletions may be blocked as shown in a minimal quarantine 230. But if the same event occurs within a threshold time period, the quarantine level may be applied as read-only 220, and so on.

Figure 4:
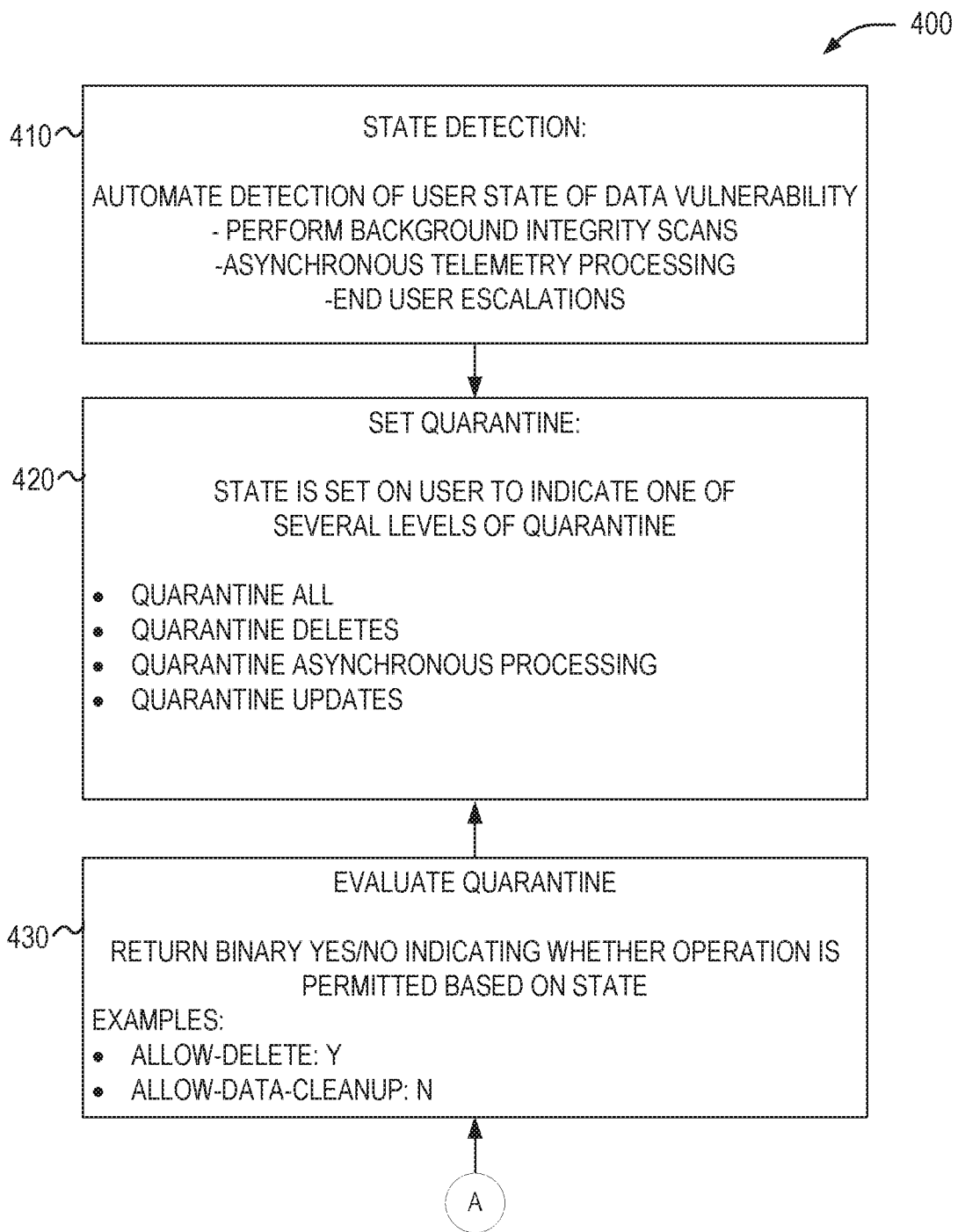
FIG. 4 is a flow diagram illustrating a method for data monitoring and quarantine, according to an embodiment.

FIG. 4 is a flow diagram illustrating a method for data monitoring and quarantine, according to an embodiment. In an embodiment, background processing may be performed to detect the state of user data, in block 410. Detection of user state of vulnerability may be automated with one or more background processes. In an example, a background process may perform continuous, or periodic integrity scans of data in the user data storage area. Asynchronous telemetry processing may be performed to identify issues with versioning, mirroring or other asynchronous activities. In an embodiment, if a user notices missing or deleted data, file corruption or other anomalies, the user may notify the cloud storage administrator and escalate the problem. Information collected from background processing and user escalations may be stored in a database for evaluation by event detection and quarantine logic. In an embodiment, the data management module may automatically detect an issue when attempting data access, and provide this telemetry to the event detection and quarantine module as a system user escalation.

An event detection module or logic may retrieve the collected telemetry and data to detect whether an event has occurred. In an embodiment, the telemetry may be stored in non-volatile storage media or be sent directly to the event detection logic. When an event occurs, the event detection logic may initiate a quarantine of the user's data, in block 420. In an embodiment, a quarantine state is set for the user, and applied to user data owned by the quarantined user. For instance, the user may have data in multiple locations, and when a quarantine is set for the user, data in the multiple locations may be affected by the quarantine. In an embodiment, the quarantine state may be set for the user and user data in a specified data storage area. If a second authorized user attempts access to the quarantined user's data, the quarantine evaluation logic 430 may identify Whether the requested data is in a quarantine state, due to the user state, as further discussed below. It will be understood that event detection and quarantine logic are described as part of the same process, but that these processes may be part of the same logic or performed by separate logic or modules either serially, in parallel, or on distributed systems. The quarantine logic may access a rules database (not shown) to identify an appropriate quarantine level based on the event detected. In an example, quarantine levels may include: (1) total or full quarantine; (2) quarantine deletions; (3) quarantine asynchronous processing (e.g., updates, versioning, etc.); and (4) quarantine updates only. In an embodiment, quarantine logic may set the user into a quarantine state, but further define a subset of data as quarantined. For example, if the user has data distributed among several file folder hierarchies on the cloud server, and a file system error is identified in only one folder, rules may dictate that only the user's data in the folder and sub-folders with the file system corruption will be put into quarantine state.

It will be understood that more or fewer levels of quarantine may be implemented in practice, depending on data, user or cloud storage policies, accesses and API capabilities. In an embodiment, the quarantine logic may flag a user data area for a specific level of quarantine by storing this information in a data store accessible by the evaluation logic, or similar. At a minimum, a user identifier and quarantine level may be associated and stored. In an embodiment, the quarantine logic may send the quarantine information for a user (e.g., user identifier and quarantine level) to quarantine evaluation logic for local storage and use.

When a quarantine level is set on user data, all access to that data (e.g., via the API or data management module) may be captured and evaluated for authorized access, in block 430. For instance, a process or function may be utilized to return a binary (e.g., Yes/No, True/False, etc.) value upon attempted access. When a user requests read access to data, the evaluation function may determine whether the access request is permitted, based on quarantine level, in an example, when there is no quarantine, all permitted accesses will return a Yes. If there is a full quarantine, all attempts to access data within the quarantine user data will return a No. When the evaluation function returns a Yes, then the requested access may be granted.

Figure 5:
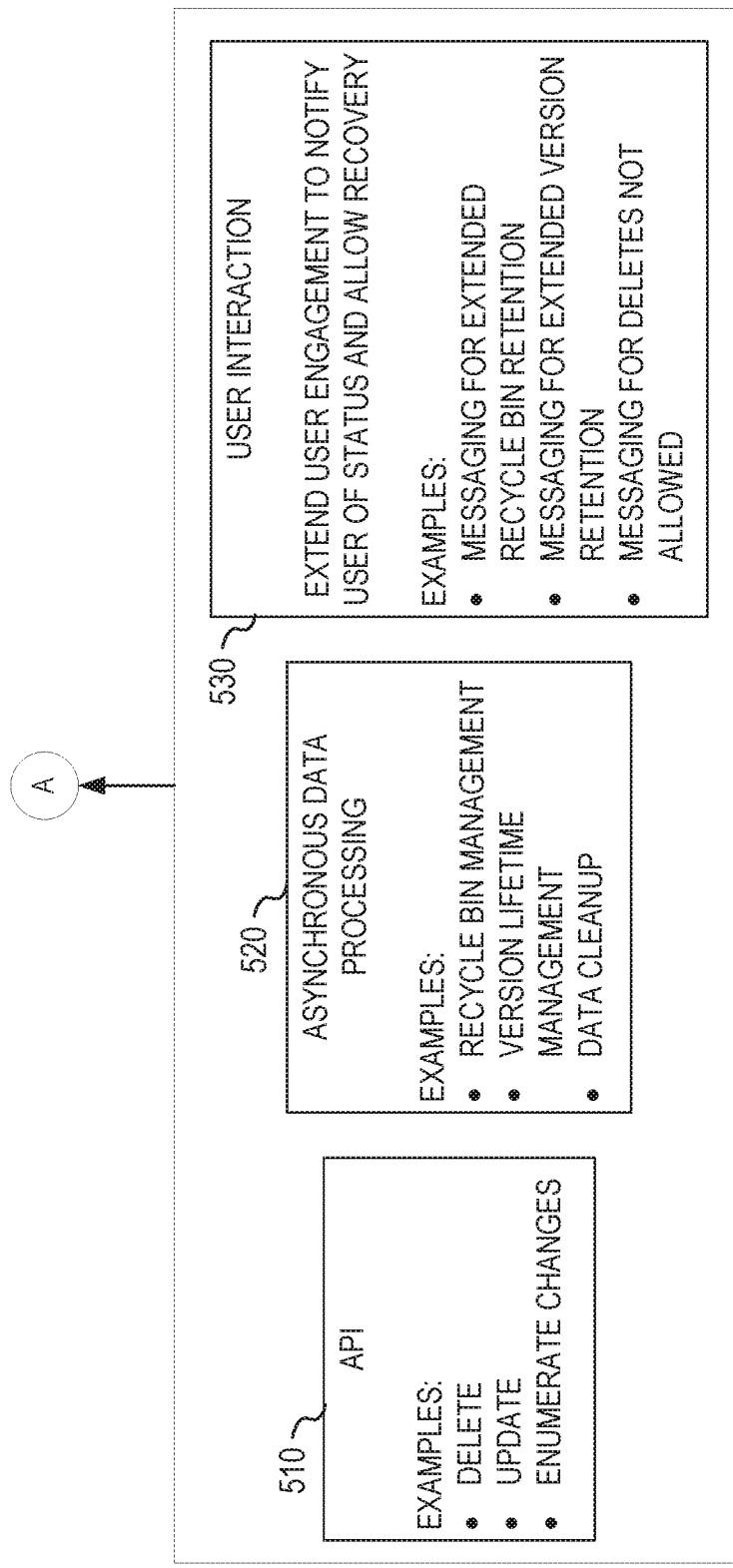
FIG. 5 is a diagram illustrating system and user operations under quarantine, according to an embodiment.

FIG. 5 is a diagram illustrating system and user operations under quarantine, according to an embodiment. In an embodiment, a user may attempt access to user data via an API call 510. In an example, a user may access another user's data when authorized to do so, for instance by being added to an access control list for the data. The data is tied to a user data storage area. In an embodiment, data is quarantined by user data storage area and not by individual file. Thus, when a first user's data is quarantined, a second user's authorized access to that data may be affected by the quarantine. In other words, the quarantine may run with a user data storage area, and not strictly with the user. Thus, access to data in user storage data area may be by one or more users via API call (e.g., for delete, update, read, enumerate changes, etc.).

Other background and administrative functions may be performed on a cloud storage system which may affect user data. For instance, asynchronous data processing 520 may be performed that is not specifically responsive to a user API call. In an example, when a user selects to delete a file (e.g., moves the file to a recycle bin or trash can), the file is not immediately deleted. A background process may execute which will delete the file after a specific time interval. Version management may be enabled to maintain earlier versions of files. An asynchronous background process may periodically delete older versions. Data cleanup of temporary files, authorized user deleted files, old versions, etc., may be periodically run to delete unnecessary files from the user data space. A quarantine level may be defined to prohibit these background processes from deleting data until recovery or further analysis is performed.

In existing systems, user interaction with their data space on cloud storage is typically limited to access via API calls. In an embodiment, messaging and recovery services may be used to extend user interaction with the cloud service, in block 530. For example, when user data has been quarantined, messaging to the user may be extended to notify the user that requested access has been denied. In an example, even if access for read is not denied, a user may receive a message warning that writes and updates will not be permitted until authorization or recovery actions are initiated. The user may be notified that deleted items are to be retained in the recycle bin indefinitely, or for an extended period of time. The user may also be notified that older versions may be retained indefinitely, or for an extended period of time. In an example, when a second user attempts access of another user's quarantined data, the data owner may receive a notification that there has both been a failed access attempt and an invitation to perform authorization or recovery. The second user may receive an access failure notice and/or a message that the data owner has been duly notified, etc.

Figure 6:
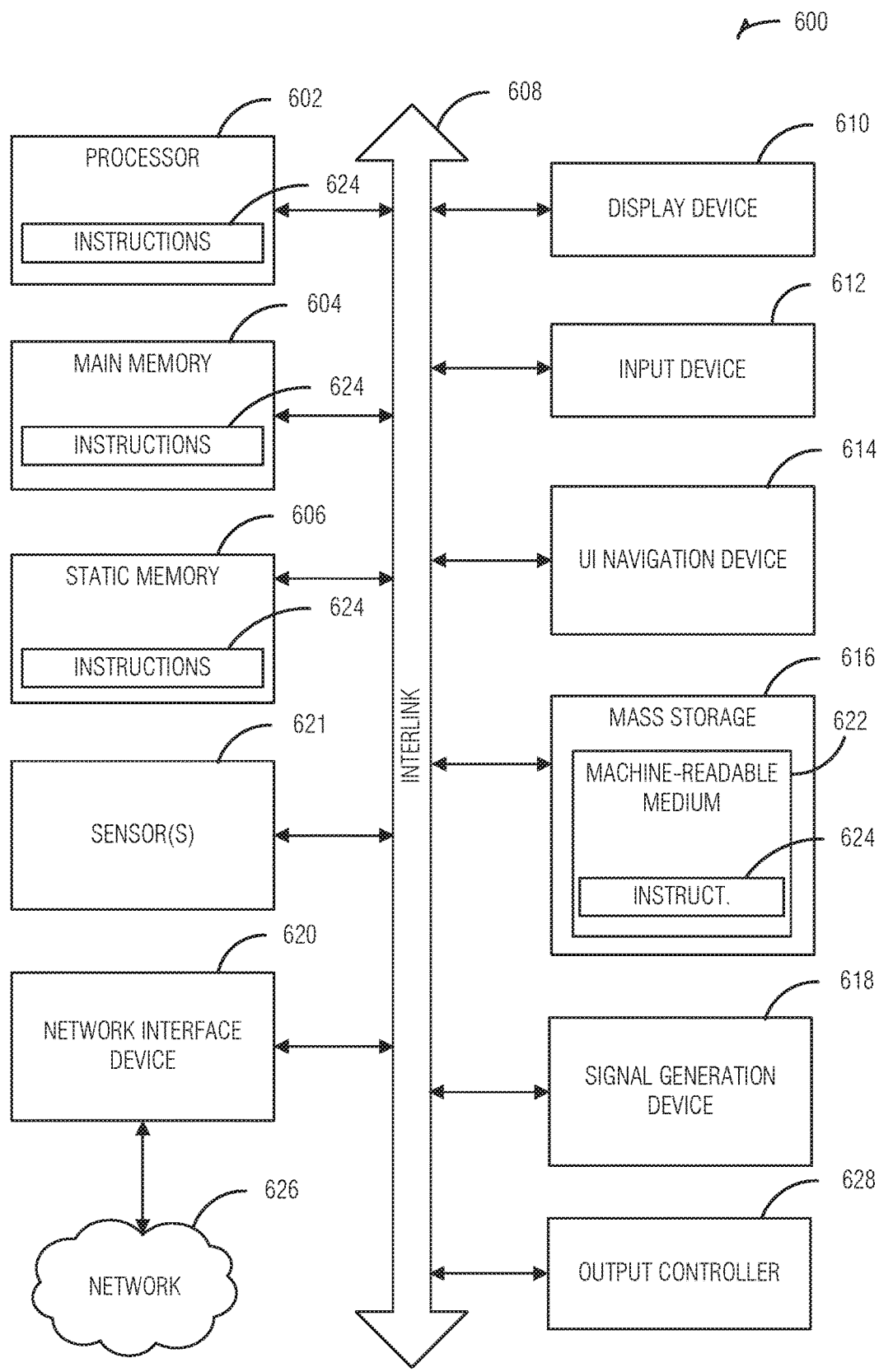
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.), Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES AND EXAMPLES

Examples may include subject matter such as a method, means for performing acts of the method, at least one machine-readable medium including instructions that, when performed by a machine cause the machine to performs acts of the method, or of an apparatus or system for data quarantine and recovery, according to embodiments and examples described herein.

Example 1 is a system for data quarantine and recovery, comprising: a cloud server configured to host data for a plurality of users including data management logic configured to manage access by a user to user data via an application program interface (API); data collection logic communicatively coupled to the API, configured to collect telemetry associated with access to the user data; and event detection logic configured to detect whether a data event has occurred, based at least on the telemetry collected, wherein the data event is to trigger a quarantine of access to user data associated with the data event and the user, and where optionally an administrator of the cloud server is to trigger a quarantine of access to user data.

In Example 2, the subject matter of Example 1 optionally includes a recovery graphical user interface (GUI) operable by the user, the recovery GUI configured to remotely enable the user to authorize the data event or perform recovery actions for the quarantine of access to the user data.

In Example 3, the subject matter of Example 2 optionally includes wherein the recovery GUI is configured to require multi-factor authentication by the user before granting access to the recovery actions.

In Example 4, the subject matter of any one or more of Examples 2-3 optionally include wherein the quarantine of access is set at a quarantine level corresponding to the data event, and wherein triggering of the quarantine of access is further to initiate a message to the user for notification of the quarantine.

In Example 5, the subject matter of Example 4 optionally includes wherein the quarantine level corresponding to the data event identifies whether access to data is to be granted for read, write, update, delete, and archive, and wherein different data event types enable different combinations of data access for the quarantine level.

In Example 6, the subject matter of any one or more of Examples 1-5 optionally include quarantine evaluation logic coupled to the data management logic, the quarantine evaluation logic configured to provide an indication Whether a requested access to the user data is one of permitted and not permitted, the indication being responsive to an attempted access of the user data, wherein the data management logic is configured to deny access to the user data when indicated as not permitted.

In Example 7, the subject matter of Example 6 optionally includes wherein the data management logic is configured to send a notification when access to the user data is denied, the notification including information to initiate recovery actions.

In Example 8, the subject matter of any one or more of Examples 6-7 optionally include wherein the data management logic is configured to query the quarantine evaluation logic before performing asynchronous processing of the user data, and when access to the user data is not permitted for a requested action, then postponing the asynchronous action.

In Example 9, the subject matter of any one or more of Examples 1-8 optionally include wherein the telemetry includes at least one of metrics associated with API calls to access the user data, metrics associated with a periodic integrity scan of the user data, or metrics associated with user data support requests, wherein the integrity scan of the user data includes at least one of: a malware scan, a scan for file corruption based on file extension or metadata, a scan for missing links, segments, or file portions, or a scan for corruption of the user data file system and file hierarchy, and wherein the metrics associated with API calls include information associated with requests associated with at least one of: file deletion requests, file modification requests, file encryption requests, file property change requests, file overwrite requests, or file move requests.

In Example 10, the subject matter of any one or more of Examples 1-9 optionally include wherein requested access to the user data is by one of the user, a second user authorized to access the user data by the user, a background process of the cloud server initiated on behalf of the user, client or cloud server system.

Example 11 is a computer implemented method for quarantine of user data, comprising: collecting telemetry associated with attempted access of the user data, the user data hosted by a cloud storage server in a user space dedicated to a first user, access to the user data being via an application program interface (API) call to the cloud storage server; detecting by the cloud storage server, a data event associated with the attempted access of the user data based on the telemetry; and triggering a quarantine of the user data associated with the data event, the quarantine including other data in the user space dedicated to the first user.

In Example 12, the subject matter of Example 11 optionally includes providing a graphical user interface (GUI) to enable the first user to perform a user action, the user action including recovery or data event authorization, the GUI to require multi-factor authentication of the first user; and wherein responsive to the user action, canceling the quarantine of the user data.

In Example 13, the subject matter of Example 12 optionally includes wherein the quarantine of the user data is set at a quarantine level corresponding to the data event, and wherein triggering of the quarantine is further to initiate a message to the first user for notification of the quarantine.

In Example 14, the subject matter of Example 13 optionally includes Wherein the quarantine level corresponding to the data event identifies whether access to the user data is to be granted for read, write, update, delete, and archive, and wherein different data event types enable different combinations of data access for the quarantine level.

In Example 15, the subject matter of any one or more of Examples 11-14 optionally include wherein the telemetry includes at least one of metrics associated with API calls to access the user data, metrics associated with a periodic integrity scan of the user data, or metrics associated with user data support requests, and wherein collecting of telemetry is performed as background processing by the cloud storage server at a pre-defined interval.

Example 16 is a machine readable storage medium, having instructions stored thereon, the instructions when executed on a machine cause the machine to: collect telemetry associated with attempted access of user data hosted by a cloud storage server in a user space dedicated to a first user, the attempted access via an application program interface (API) call to the cloud storage server; collect metrics associated with a periodic integrity scan of the user data; responsive to a user data support request reporting problems with data access, collect metrics associated with the user data support request; detect by the cloud storage server, a data event associated with one of the attempted access of the user data based on the telemetry, the periodic integrity scan, user data support request, data management operation indicating a problem, or manual quarantine request by an administrator; trigger a quarantine of the user space dedicated to the first user, the data event associated with the user data in the user space; and send a message to the first user for notification of the quarantine.

In Example 17, the subject matter of Example 16 optionally includes wherein the quarantine of the user space is set at a quarantine level corresponding to the data event, wherein the quarantine level corresponding to the data event identifies whether access to data in the user space is to be granted for one or more of read, write, update, delete, and archive, and wherein different data event types enable different combinations of data access for the quarantine level.

In Example 18, the subject matter of Example 17 optionally includes instructions to: responsive to a request to access user data, evaluate the quarantine level for the user space; provide an indication whether the requested access to the user data is one of permitted and not permitted; and deny access to the user data when indicated as not permitted, wherein when the user space has not been quarantined, the quarantine level is evaluated as allowing full access.

In Example 19, the subject matter of Example 18 optionally includes instructions to: perform asynchronous processing of the user data in a background process of the cloud storage server, the background process configured to manage user data in the user space for hard deletions, versioning control, recycle bin management, and other data cleanup, wherein when access to the user data is not permitted for a requested asynchronous action, then postponing the asynchronous action until the access is permitted for the asynchronous action.

In Example 20, the subject matter of any one or more of Examples 16-19 optionally include instructions to: provide a recovery graphical user interface (GUI) operable by the first user, the recovery GUI configured to remotely enable the first user to authorize the detected data event or perform recovery actions for the quarantine of the user space; and perform multi-factor authentication by the user before granting access to the recovery actions.

Example 21 is a system configured to perform operations of any one or more of Examples 1-20.

Example 22 is a method for performing operations of any one or more of Examples 1-20.

Example 23 is a machine readable medium including instructions that, when executed by a machine cause the machine to perform the operations of any one or more of Examples 1-20.

Example 24 is a system comprising means for performing the operations of any one or more of Examples 1-20

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired, in any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure.

However, the Abstract is submitted with the understanding that it will not be used to interpret or limit the scope or meaning of the claims.

What is claimed is:

1. A system, comprising:
    a cloud server comprising a processor, and a memory storing instructions that, when executed by the processor, configure the cloud server to:
        host user data that is accessible from a user device;
        manage access by the user device to user data via an application program interface (API) in an application operating at the user device;
        monitor a number of API calls and a type of request of the API calls from the API to the cloud server;
        collect telemetry that identifies the number of API calls and the type of request of the API calls;
        define an allowable threshold for the number of API calls of the corresponding type of request of API calls;
        detect, based on whether the collected telemetry exceeds the allowable threshold, whether a data event has occurred; and
        in response to detecting that the data event has occurred, deny access from the user device to the user data associated with the data event and the user device.

2. The system as recited in claim 1, further comprising:
    a recovery graphical user interface (GUI) operable by a user from the user device communicatively coupled to the cloud server, the recovery GUI configured to remotely enable the user to authorize the data event or perform recovery actions for the quarantine of access to the user data,
    wherein the recovery GUI is configured to require multi-factor authentication by the user before granting access to the recovery actions,
    wherein the telemetry further comprises API error codes, a user level quality of service (QoS), and user data support requests,
    wherein the allowable threshold indicates a threshold quantity for a corresponding API error code, a threshold level for the user level QoS, and a threshold number for user data support requests.

3. The system as recited in claim 2, wherein the quarantine of access is set at a quarantine level corresponding to the data event, and wherein triggering of the quarantine of access is further to initiate a message to the user for notification of the quarantine.

4. The system as recited in claim 3, wherein the quarantine level corresponding to the data event identifies whether access to data is to be granted for read, write, update, delete, and archive, and wherein different data event types enable different combinations of data access for the quarantine level.

5. The system as recited in claim 1, further comprising quarantine evaluation logic coupled to the data management logic and operable by the processor coupled to the cloud server, the quarantine evaluation logic configured to provide an indication whether a requested access to the user data is one of permitted and not permitted, the indication being responsive to an attempted access of the user data, wherein the data management logic is configured to deny access to the user data when indicated as not permitted.

6. The system as recited in claim 5, wherein the cloud server is configured to send a notification when access to the user data is denied, the notification including information to initiate recovery actions.

7. The system as recited in claim 5, wherein the cloud server is configured to query the quarantine evaluation logic before performing asynchronous processing of the user data, and responsive to an indication that access to the user data is not permitted for a requested asynchronous action, then postponing the asynchronous action.

8. The system as recited in claim 5, wherein the cloud server is further configured to identify a quarantine state for a user of the user device that was set manually, by an administrator of the cloud server.

9. The system as recited in claim 1, wherein the telemetry includes at least one of metrics associated with API calls to access the user data, metrics associated with a periodic integrity scan of the user data, or metrics associated with user data support requests,
    wherein the integrity scan of the user data includes at least one of:
        a malware scan,
        a scan for file corruption based on file extension or metadata,
        a scan for missing links, segments, or file portions, or
        a scan for corruption of a user data file system and file hierarchy, and
    wherein the metrics associated with API calls include information associated with requests associated with at least one of:
        file deletion requests,
        file modification requests,
        file encryption requests,
        file property change requests,
        file overwrite requests, or
        file move requests.

10. The system as recited in claim 1, wherein requested access to the user data originates from one of:
    a first user of the device, a second user authorized to access the user data by the first user, a background process of the cloud server initiated on behalf of the first user, or a client or cloud server system.

11. A computer implemented method for quarantine of user data, comprising:
    monitoring a number of API calls and a type of request of the API calls from the API to a cloud storage server;
    collecting telemetry that identifies the number of API calls and the type of request of the API calls associated with attempted access of the user data, the user data hosted by the cloud storage server in a user space dedicated to a first user;
    define an allowable threshold for the number of API calls of the corresponding type of request of API calls;
    detecting, based on the collected telemetry exceeding the allowable threshold, by the cloud storage server, a data event associated with an attempted access of the user data via the API calls; and
    triggering a quarantine of the user data associated with the data event, the quarantine including other data in the user space dedicated to the first user.

12. The computer implemented method as recited in claim 11, further comprising:
    providing a graphical user interface (GUI) to enable the first user to perform a user action, the user action including recovery or data event authorization, and the GUI to require multi-factor authentication of the first user; and
    canceling the quarantine of the user data, responsive to the user action, wherein the telemetry further comprises API error codes, a user level quality of service (QoS), and user data support requests, wherein the allowable threshold indicates a threshold quantity for a corresponding API error code, a threshold level for the user level QoS, and a threshold number for user data support requests.

13. The computer implemented method as recited in claim 12, wherein the quarantine of the user data is set at a quarantine level corresponding to the data event, and wherein triggering of the quarantine is further to initiate a message to the first user for notification of the quarantine.

14. The computer implemented method as recited in claim 13, wherein the quarantine level corresponding to the data event identifies whether access to the user data is to be granted for read, write, update, delete, and archive operations, and wherein different data event types enable different combinations of data access for the quarantine level.

15. The computer implemented method as recited in claim 11, wherein the telemetry includes at least one of metrics associated with API calls to access the user data, metrics associated with a periodic integrity scan of the user data, or metrics associated with user data support requests, and wherein collecting of telemetry is performed as background processing by the cloud storage server at a pre-defined interval.

16. A non-transitory machine readable storage medium, having instructions stored thereon, the instructions when executed on a machine cause the machine to:
monitor a number of API calls and a type of request of the API calls from the API to a cloud storage server;
collect telemetry that identifies the number of API calls and the type of request of the API calls associated with attempted access of user data hosted by the cloud storage server in a user space dedicated to a first user;
collect metrics associated with a periodic integrity scan of the user data;
responsive to a user data support request reporting problems with data access, collect metrics associated with the user data support request;
define an allowable threshold for the number of API calls of the corresponding type of request of API calls;
detect by the cloud storage server, based on the collected telemetry exceeding the allowable threshold, a data event associated with one of the attempted access of the user data, the periodic integrity scan, user data support request, data management operation indicating a problem, or manual quarantine request by an administrator;
trigger a quarantine of the user space dedicated to the first user, the data event associated with the user data in the user space; and
send a message to the first user for notification of the quarantine.

17. The medium as recited in claim 16, wherein the quarantine of the user space is set at a quarantine level corresponding to the data event, wherein the quarantine level corresponding to the data event identifies whether access to data in the user space is to be granted for one or more of read, write, update, delete, and archive, and wherein different data event types enable different combinations of data access for the quarantine level.

18. The medium as recited in claim 17, further comprising instructions to:
responsive to a request to access user data, evaluate the quarantine level for the user space;
provide an indication whether the requested access to the user data is one of permitted and not permitted; and
deny access to the user data when indicated as not permitted, wherein when the user space has not been quarantined, the quarantine level is evaluated as allowing full access.

19. The medium as recited in claim 18, further comprising instructions to:
perform asynchronous processing of the user data in a background process of the cloud storage server, the background process configured to manage user data in the user space for hard deletions, versioning control, recycle bin management, and other data cleanup, wherein responsive to an indication that access to the user data is not permitted for a requested asynchronous action, then postponing the asynchronous action until the access is permitted for the asynchronous action.

20. The medium as recited in claim 16, further comprising instructions to:
provide a recovery graphical user interface (GUI) operable by the first user, the recovery GUI configured to remotely enable the first user to authorize the detected data event or perform recovery actions for the quarantine of the user space; and
perform multi-factor authentication by the user before granting access to the recovery actions.

* * * * *